(12) United States Patent
Salim et al.

(10) Patent No.: US 7,131,281 B2
(45) Date of Patent: Nov. 7, 2006

(54) AUTOMOTIVE HVAC SYSTEM AND METHOD OF OPERATING SAME UTILIZING EVAPORATOR FREEZING

(75) Inventors: Munther M. Salim, Macomb, MI (US); Gregory A. Major, Farmington Hills, MI (US); Jeffrey A Bozeman, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/223,627

(22) Filed: Sep. 9, 2005

(65) Prior Publication Data
US 2006/0005551 A1    Jan. 12, 2006

Related U.S. Application Data

(62) Division of application No. 10/853,430, filed on May 25, 2004, now Pat. No. 6,988,371.

(51) Int. Cl.
*B60H 1/32* (2006.01)
(52) U.S. Cl. .......................................... 62/139; 62/244
(58) Field of Classification Search .................. 62/239, 62/59, 244, 264, 139–140
See application file for complete search history.

(56) References Cited

U.S. PATENT DOCUMENTS

| | | | | | |
|---|---|---|---|---|---|
| 2,128,021 | A | * | 8/1938 | Smith | 62/59 |
| 2,170,992 | A | * | 8/1939 | Grady | 62/59 |
| 3,059,449 | A | * | 10/1962 | Dilliner | 62/239 |
| 4,193,271 | A | * | 3/1980 | Honigsbaum | 62/180 |
| 6,539,727 | B1 | * | 4/2003 | Burnett | 62/78 |
| 6,708,512 | B1 | * | 3/2004 | Kitamura et al. | 62/227 |

* cited by examiner

*Primary Examiner*—William E. Tapolcai
(74) *Attorney, Agent, or Firm*—Laura C. Hargitt

(57) ABSTRACT

The present invention concerns a method for cooling a passenger compartment in a hybrid vehicle that operates an engine intermittently during vehicle operation, the hybrid vehicle having an HVAC system including an HVAC duct, a blower adapted to direct a flow of air through the HVAC duct, and an evaporator located within the HVAC duct. The method includes the steps of operating the blower; operating the compressor; allowing a predetermined amount of ice to form on the evaporator during operation of the compressor; turning off the vehicle engine; ceasing operation of the compressor; measuring an indicator corresponding to a remaining amount of the predetermined amount of ice formed on the evaporator; and re-starting the compressor when a predetermined air temp in air duct is reached.

16 Claims, 3 Drawing Sheets

AUTOMOTIVE HVAC SYSTEM AND METHOD OF OPERATING SAME UTILIZING EVAPORATOR FREEZING

RELATED APPLICATION

This application is a division of U.S. Ser. No. 10/853,430 filed on May 25, 2004 now U.S. Pat. No. 6,988,371.

BACKGROUND OF THE INVENTION

The present invention relates generally to automotive HVAC systems and methods of operating such HVAC systems.

Automotive HVAC systems are well known and are utilized for heating and cooling the passenger compartments of vehicles. Hybrid vehicles, which utilize a battery and an intermittently operated internal combustion engine for vehicle propulsion, have difficulty keeping the passenger compartment cool when the engine is off. When the engine is off, the HVAC compressor, typically run by a clutch connected to the engine, is also off and the temperature in the passenger compartment can rise quickly. The hybrid vehicle is most efficient when the engine is not running and, therefore, any extended increment of time that the engine is off increases fuel savings and reduces emissions.

It is desirable, therefore, to provide an HVAC system that allows for extended engine off time in hybrid vehicles while keeping the passenger compartment of the vehicle cool and also for pre-cooling in conventional vehicles.

SUMMARY OF THE INVENTION

The present invention concerns a method for cooling a passenger compartment in a hybrid vehicle that operates an engine intermittently during vehicle operation, the hybrid vehicle having an HVAC system including an HVAC duct, a blower adapted to direct a flow of air through the HVAC duct, and an evaporator located within the HVAC duct. The method includes the steps of operating the blower; operating the compressor, whereby refrigerant flows through the evaporator and absorbs heat from air flowing in the air duct; allowing a predetermined amount of ice to form on the evaporator during operation of the compressor; turning off the vehicle engine; performing one of ceasing or significantly reducing the capacity of the compressor; measuring an indicator corresponding to a remaining amount of the predetermined amount of ice formed on the evaporator; and performing one of re-starting or significantly increasing the capacity of the compressor when a predetermined air temperature in the air duct is reached. Alternatively, the re-starting or significantly increasing the capacity of the compressor is performed when the indicator measures an amount of ice that is less than a predetermined amount of remaining ice.

An advantage of the present invention is that the ice built up on the exterior surface of the evaporator is utilized when the engine is not running in hybrid vehicles to continue to provide cool air to the passenger compartment, which results in extended engine-off periods, leading to additional fuel savings and emissions reduction.

The method and HVAC system may also be utilized with conventional internal combustion engine vehicles whereby ice is allowed to form on the exterior surface of the evaporator, with formed ice available to provide precooling for the HVAC system at a later time.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1A:
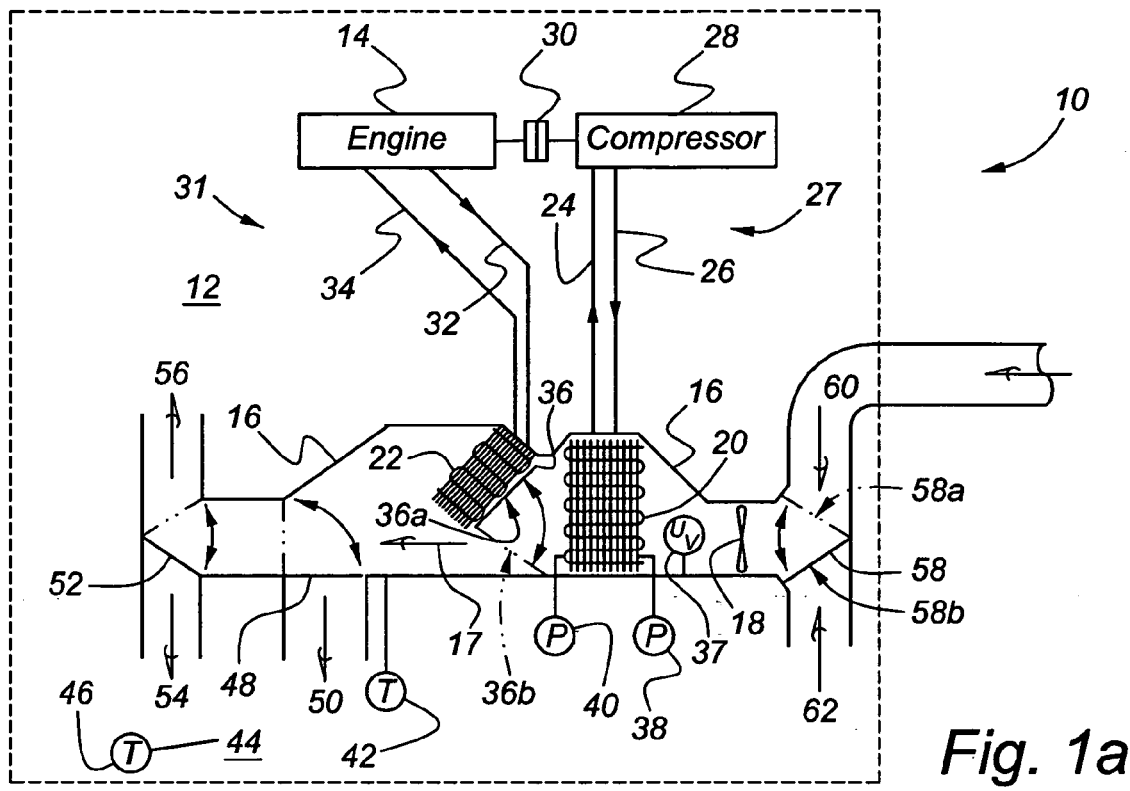
FIG. 1a is a schematic view of a HVAC system in accordance with the present invention.
Figure 1B:
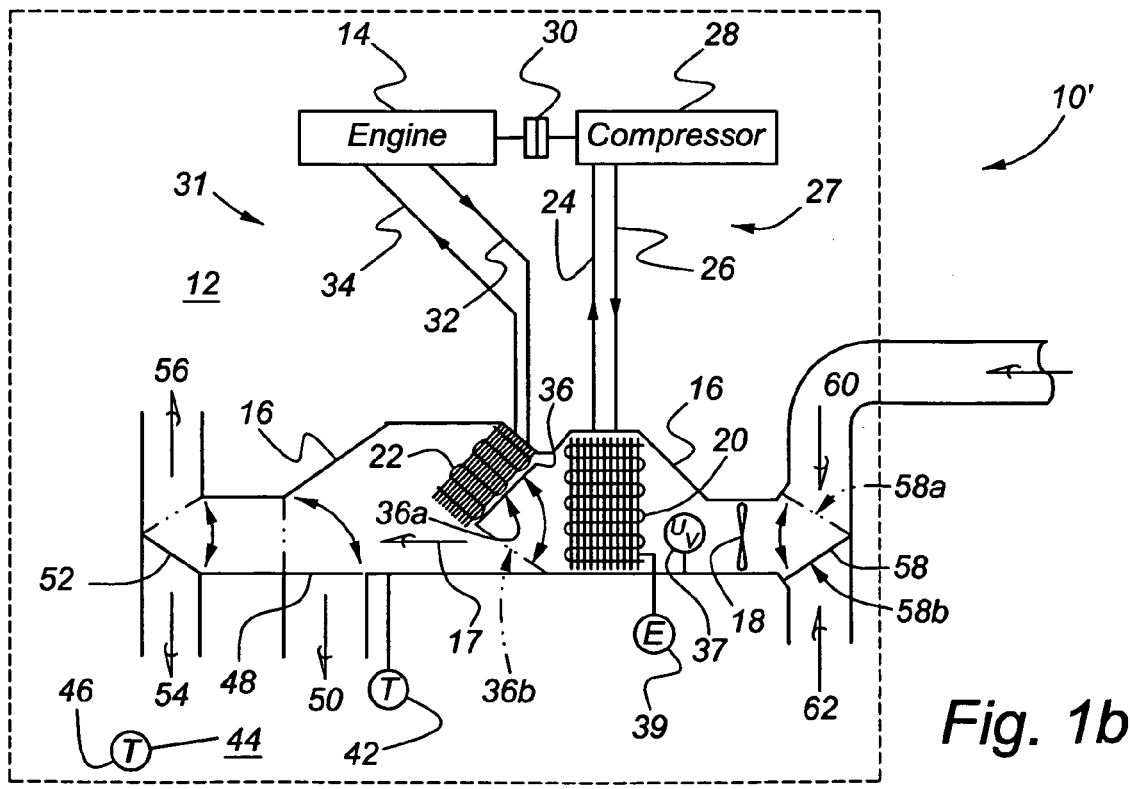
FIG. 1b is a schematic view of an alternative embodiment of a HVAC system in accordance with the present invention

Referring now to FIGS. 1a and 1b, a HVAC system in accordance with the present invention is indicated generally at 10 in FIG. 1a and at 10' in FIG. 1b. The HVAC system 10 and 10' is disposed in a vehicle, indicated generally at 12. The vehicle 12 may be a hybrid vehicle having an internal combustion engine 14 operating in conjunction with a battery (not shown) or a conventional vehicle having the internal combustion engine 14 only. The HVAC system includes a HVAC air duct 16 and a blower 18 adapted to direct a flow of air in a direction indicated by an arrow 17 through the HVAC duct 16. An evaporator 20 is located within the HVAC duct 16 downstream of the blower 18. A heater core 22 is located within the HVAC duct 16 downstream of the evaporator 20. The evaporator 20 includes a refrigerant inlet 24 from and a refrigerant outlet 26 to a refrigerant circuit, indicated generally at 27, including a refrigerant compressor 28. Preferably, the compressor 28 is driven by the engine 14 through a clutch 30. The compressor 28 may be a fixed displacement compressor or a variable displacement compressor, as will be appreciated by those skilled in the art. Alternatively, the compressor 28 is a variable displacement compressor that is driven by the engine but does not include a clutch, or is an electric-driven compressor. The refrigeration circuit 27, of course, may also include a condenser (not shown), a receiver/dryer (not shown), and a thermostatic expansion valve or orifice tube (not shown) in fluid communication with the compressor 28 and the evaporator 20. A refrigerant is contained in the refrigerant circuit 27 and so flows through the refrigerant inlet 24, the refrigerant outlet 26, the compressor 28, and the evaporator 20. The refrigerant is selectively circulated through the piping during operation of the HVAC system 10 or 10', discussed in more detail below. The heater core 22 has a coolant inlet 32 from and a coolant outlet 34 to an engine cooling circuit, indicated generally at 31, of the internal combustion engine 14. A coolant (not shown), such as a glycol/water mixture or the like, is contained in the engine cooling circuit 31 and thus flows through the coolant inlet 32, the coolant outlet 34, the engine 14, and the heater core 22. The coolant selectively circulates through the engine cooling circuit 31 during operation of the HVAC system 10 or 10', discussed in more detail below. A damper 36 is disposed in the HVAC duct 16 downstream of the evaporator 20 and adjacent the heater core 22. The damper 36 includes an actuator (not shown) such as an electric motor or the like that is operable to selectively expose and block the heater core 22 to an air flow from the blower 18. When the damper 36 is in a first position 36a, the air flowing from the blower 18 in the direction 17 bypasses the heater core 22. When the damper 36 is in a second position 36b, the air flowing from the blower 18 in the direction 17 flows through the heater core 22.

Referring now to FIG. 1a, a first pressure sensor 38 is disposed on an upstream surface of the evaporator 20 adjacent the blower 18 and a second pressure sensor 40 is disposed on an opposite downstream surface of the evaporator 20 adjacent the heater core 22. The pressure sensors 38 and 40 are operable to provide signals corresponding to measured pressure values, discussed in more detail below.

Referring now to FIG. 1b, an emissivity measuring device 39, such as a spectrometer or the like is disposed on an upstream or a downstream surface of the evaporator 20, depending where the onset of icing is anticipated to form, such as toward the end of the last pass (not shown) of the evaporator. The emissivity measuring device 39 is operable to provide a signal that corresponds to a measured emissivity value.

Referring again to FIGS. 1a and 1b, a duct temperature measurement device 42, such as a temperature sensor or the like, is disposed in the HVAC duct 16 downstream of the heater core 22. The HVAC air duct 16 extends to a passenger compartment, indicated schematically at 44. A passenger compartment temperature measurement device 46 is disposed in the passenger compartment 44. A first damper 48 is disposed in the HVAC duct 16 downstream of the heater core 22 for distributing air to a floor outlet 50 in the passenger compartment 44. A second damper 52 is disposed in the HVAC duct 16 downstream of the heater core 22 for distributing air to either or both of a torso outlet 54 or a windshield outlet 56 in the passenger compartment 44. A recirculation damper 58 is disposed between an outside or fresh air inlet 60 and a recirculation air or return inlet 62 from the passenger compartment 44 to supply air to the blower 18. The recirculation damper 58 can move between a first position 58a and a second position 58b. The recirculation damper 58 is operable to selectively provide only fresh air from the fresh air inlet 60 (when in the first position 58a), only recirculated air from the return inlet 62 (when in the second position 58b), or a mixture of fresh air and recirculated air to the blower 18. Each of the dampers 48, 52 and the recirculation damper 58 include an actuator (not shown) such as an electric motor or the like for moving the dampers 48, 52 and 58 between respective closed and open positions.

Figure 2:
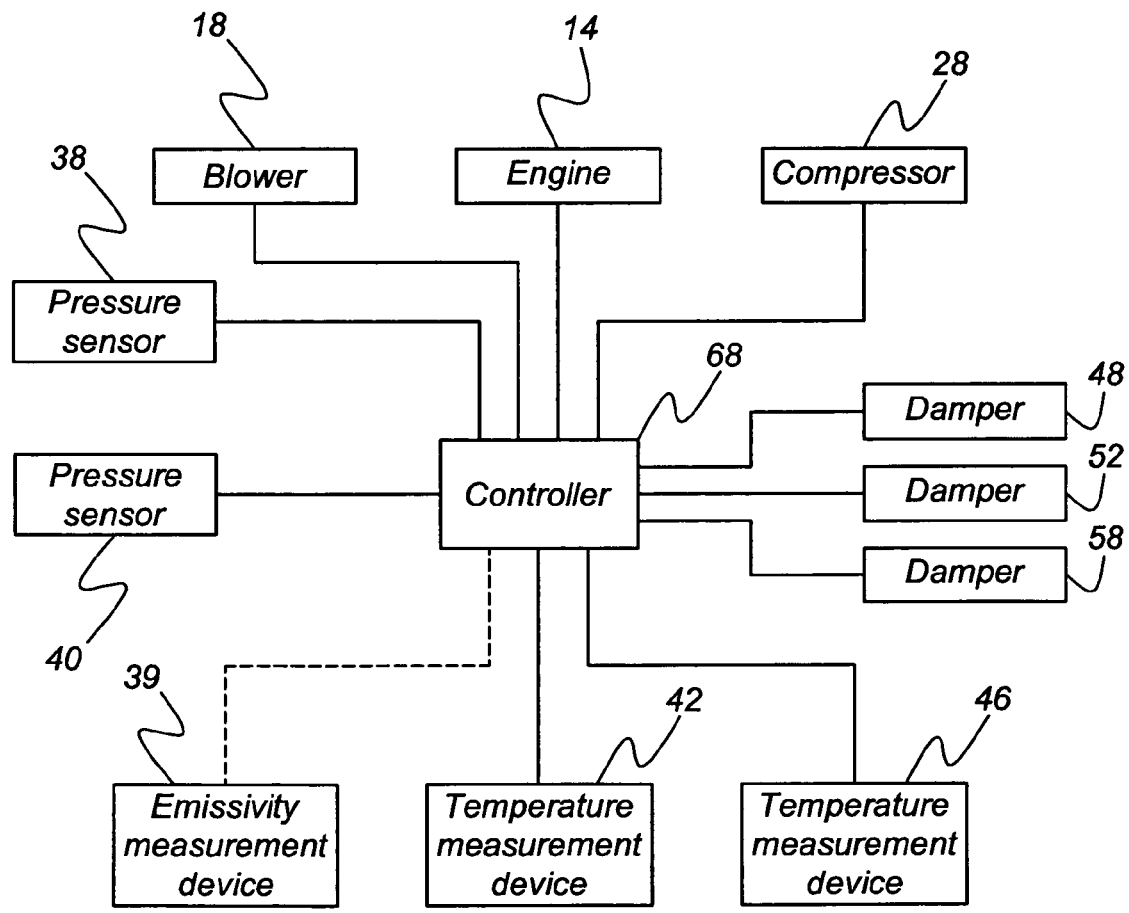
FIG. 2 is a block diagram of a HVAC system in accordance with the present invention.

Referring now to FIG. 2, the HVAC system 10 or 10' includes a controller 68 electrically connected to and operatively engaging the compressor 28, such as through the clutch 30 shown in FIG. 1, the blower 18, the pressure sensors 38 and 40 or emissivity measuring device 39, the duct temperature measurement device 42, and the passenger compartment temperature measurement device 46. The controller 68 is electrically connected to and operatively engages the respective actuators of the dampers 48, 52, and 58. The controller 68 is preferably an electronic control unit, such as an HVAC control unit or the like. The controller 68 may be a single microprocessor or a plurality of interconnected microprocessors. Furthermore, the controller 68 may be hardware, software, or any combination thereof as will be appreciated by those skilled in the art. The controller 68 is operable to receive signals, such as from the measurement devices 38, 39, 40, 42, and 46 and to transmit commands, such as to the compressor 28, the blower 18, and the actuators of the dampers 48, 52, and 58 during operation of the HVAC system 10 or 10'.

In operation, the HVAC system 10 or 10' is activated and the controller 68 activates the blower 18 to move air through the HVAC duct 16 and through the evaporator 20. The controller 68 also sends a signal to the clutch 30 to engage and operate the compressor 28. When the compressor 28 operates, the refrigerant is compressed in the compressor 28 and flows from the compressor 28, to the refrigerant inlet 24, through the tubes (not shown) or the like of the evaporator 20, to the refrigerant outlet 26 and back to the compressor 28. The refrigerant in the, evaporator 20 absorbs heat from air in the HVAC duct 16 flowing in the direction 17, cooling the air for distribution to the passenger compartment 44. As the refrigerant flows inside the evaporator 20 and begins a phase change at a given saturation temperature, the refrigerant suffers from a pressure drop due to friction with the inner surface of the tube walls. As a result of this pressure drop, at some point in the evaporator 20, usually towards the end of last pass of the coils of the evaporator 20, the temperature of the refrigerant drops below the freezing temperature of moisture content in air. The controller 68 allows the compressor 28 to continue to operate at this condition and the upstream surface of the evaporator 20, therefore, is cooled such that ice is allowed to begin to form on the upstream surface of the evaporator 20.

In the HVAC system 10 of FIG. 1a, the ice is preferably formed on the upstream surface of the evaporator 20 at a predetermined location adjacent the pressure sensor 38. As ice continues to form on the upstream surface of the evaporator 20, the ice accumulation will block the air flowing across the evaporator 20 on the upstream surface adjacent the pressure sensor 38. The measured pressure at the pressure sensor 38 will be greater than the measured pressure at the pressure sensor 40 on the downstream surface of the evaporator 20. This measured difference in pressure value (i.e., pressure drop) corresponds to an amount of ice formed on the upstream surface of the evaporator 20 and, as the ice continues to build up, the pressure drop increases. When the pressure drop reaches a value equal to a predetermined amount of ice having formed on the upstream surface of the evaporator 20, the HVAC system 10 is again operated normally.

Similarly, in the HVAC system 10' of FIG. 1b, the ice is preferably formed on the upstream surface of the evaporator 20 at a predetermined location adjacent the emissivity measuring device 39. As ice continues to form on the upstream surface of the evaporator 20, the ice accumulation will build up on the evaporator 20 on the upstream surface adjacent the emissivity measuring device 39. The emissivity value measured by the emissivity measuring device 39 will change as the ice accumulated on the evaporator 20 increases. The measured emissivity value is corresponds to an amount of ice formed on the upstream surface of the evaporator 20 and, as the ice continues to build up, the emissivity value increases. The measured emissivity value is compared to a constant stored in the emissivity measuring device 39, or a constant stored in the controller 68 or the like. When the difference between the measured emissivity value and the constant emissivity value reaches a value equal to a predetermined amount of ice having formed on the upstream surface of the evaporator 20, a feedback signal is sent to the controller 68, requesting a termination of the icing process. At this point, the controller sends a signal to the compressor 28 to reduce displacement, cease functioning, or the like. As a result, the temperature in the evaporator 20 would begin to rise again and the ice on the upstream surface of the evaporator 20 starts melting slowly. Once, the ice melts below a predetermined value, another signal is sent to the controller, which triggers the controller 68 to send a signal to the compressor 28 to begin functioning again, to maximize the stroke again or the like. The icing process repeats, depending on the driving schedule, ambient temperature, and other factors including but not limited to ambient humidity, the cooling load of the HVAC system 10', or the like.

If the vehicle 12 is a hybrid vehicle, the engine 14 is selectively turned off under certain vehicle operating conditions. While the engine 14 is turned off, it can no longer drive the compressor 28. Thus, the flow of refrigerant through the refrigerant inlet 24, the refrigerant outlet 26, the compressor 28, the evaporator 20, and the rest of the refrigeration circuit 27 is stopped. Alternatively, if the compressor 28 is an electric-driven compressor, the output of the compressor is significantly reduced or stopped in order to limit the drain on the battery. The blower 18, however, continues to move air through the evaporator 20 and the HVAC duct 16, and the air flowing through the evaporator 20 transfers heat to the refrigerant in the evaporator 20. The air also transfers heat to the ice formed on the upstream surface of the evaporator 20, gradually melting the ice. The temperature of the air flowing through the HVAC duct 16 is measured by the duct temperature measurement device 50 and monitored by the controller 68. The pressure drop across the evaporator 20 is measured by the pressure sensors 38 and 40 and is also monitored by the controller 68. The ice formed on the upstream surface of the evaporator 20 acts as a thermal mass in addition to the refrigerant in the evaporator 20 and allows the air in the HVAC duct 16 to continue to be cooled with the engine 14 off or the compressor 28 in a reduced output, resulting in an extended engine-off period for the hybrid vehicle, which leads to additional fuel savings and emissions reduction. After the measured duct outlet temperature is above a predetermined temperature, the engine 14 is restarted, the compressor 28 is again engaged by the clutch 30 or increased in output and the HVAC system 10 or 10' functions again as discussed above.

Alternatively, the HVAC system 10 or 10' is operated with the compressor 28 off or in reduced output until the differential measured by the pressure sensors 38 and 40 drops to or reaches a predetermined value, such as approaching zero, or until the measured emissivity value drops to or reaches a predetermined value, such as approaching the constant emissivity value stored in the emissivity measuring device 39 or in the controller 68. After the pressure differential or the measured emissivity value reaches the respective predetermined value, the engine 14 is restarted, the compressor 28 is again engaged by the clutch 30 or increased in output and the HVAC system 10 or 10' functions again as above.

Alternatively, even if the vehicle 12 is not a hybrid vehicle, the ice buildup on the upstream surface of the evaporator 20 can be used to lower the overall surface temperature and avoid the blast of hot air that usually occurs after shutting off the A/C system and starting it again after a short while. Then, if one turns the engine 14 off for a short period of time, for example to run an errand, and then restarts the engine 14, the ice formed on the upstream surface of the evaporator 20 can be employed to provide pre-cooling to the passenger compartment 44 more quickly while the refrigeration circuit 27 is just beginning to operate, thus beginning the cooling process more quickly than with a conventional HVAC system. The length of the time a vehicle can be off and still provide the pre-cooling, of course, depends on the ambient temperature and solar load on the vehicle 12.

Preferably, the upstream surface of the evaporator 20 where icing is desirable is shaped to prevent water from easily draining therefrom to encourage icing during operation of the HVAC system 10 or 10'. Furthermore, it is desirable to provide an ultraviolet (UV) light 37, in the vicinity of drained water, such as in the HVAC duct 16 where a drain condensate tray (not shown) is located. The UV radiation from the UV light 37 kills any bacterial and/or microbial growth associated with the ice and water in the HVAC system 10 or 10'.

Figure 3:
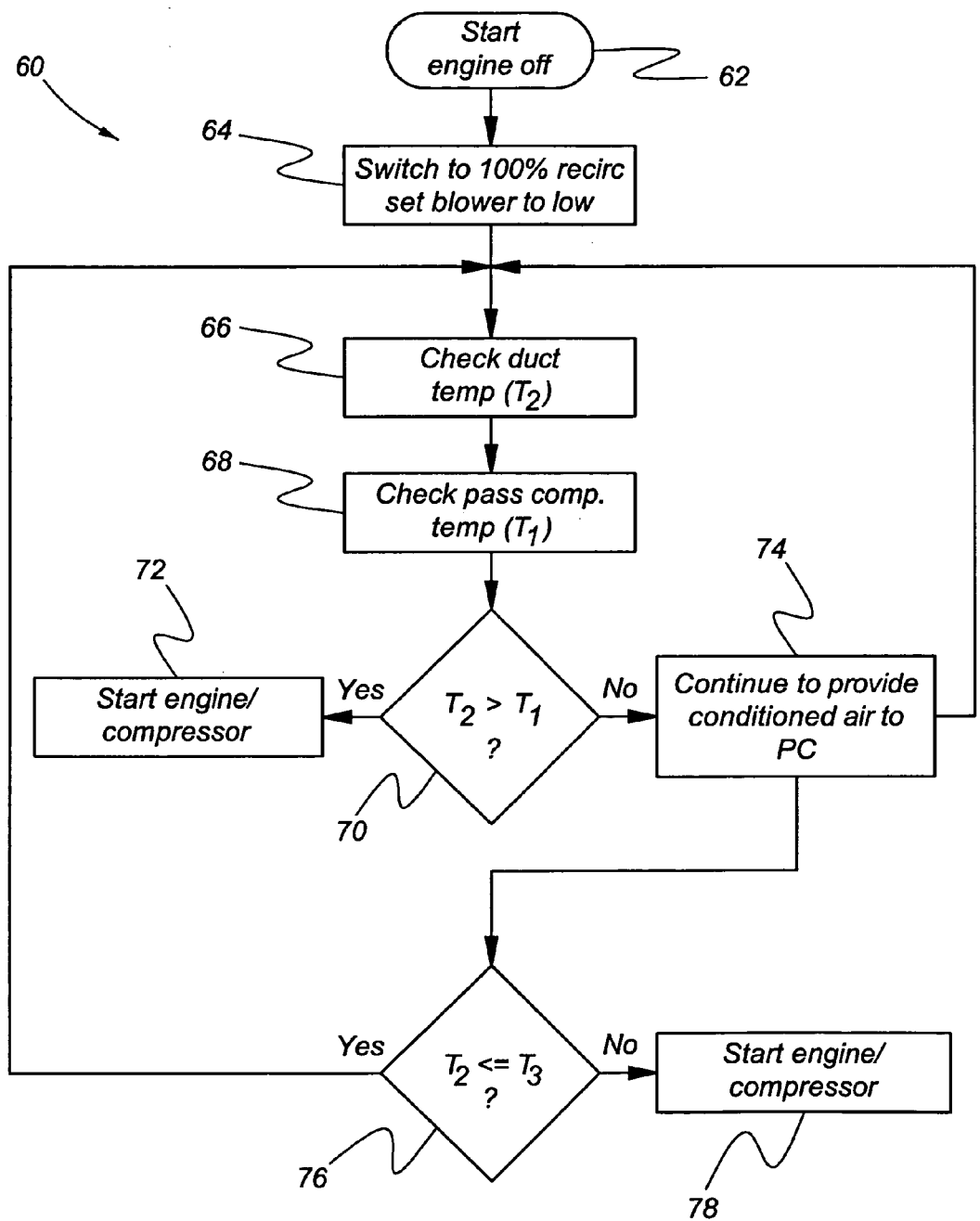
FIG. 3 is a flowchart of a method of operating the HVAC system of FIGS. 1a, 1b, and 2 in accordance with the present invention.

Referring now to FIG. 3, a flowchart of a method of operating the HVAC system 10 or 10' in accordance with the present invention is indicated generally at 60. In a step 62, the engine, such as the engine 14 in FIGS. 1*a* and 1*b*, is turned off. In a step 64, the HVAC system 10 or 10' is turned to a full recirculation mode, such as by moving the damper 58 of FIGS. 1*a* and 1*b* from the position 58*b* to the position 58*a* and a blower, such as the blower 18 in FIG. 1, is turned to a lower output to conserve battery power. In a step 66, a duct outlet temperature is measured, such as by the duct temperature measurement device 42 of FIGS. 1*a* and 1*b*. In a step 68, a passenger compartment temperature is measured, such as by the passenger compartment temperature-measurement device 46 of FIGS. 1*a* and 1*b*. In a step 70, the duct outlet temperature is compared to the passenger compartment temperature. If the duct outlet temperature is greater than the passenger compartment temperature, a request is sent to restart the engine in a step 72. If the duct outlet temperature is greater than the passenger compartment temperature, the HVAC system 10 or 10' continues the operation of the blower to provide cooled air to a passenger compartment, such as the passenger compartment 44 in FIGS. 1*a* and 1*b*, in a step 74. In a step 76, the duct outlet temperature is compared to a predetermined value, such as 15 degrees Celsius. If the duct outlet temperature is greater than the predetermined temperature, a request is sent to restart the engine in a step 78. If the evaporator outlet temperature is less than the predetermined temperature, the method 60 returns to the step 66 to measure the evaporator outlet temperature.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An automotive HVAC system, the HVAC system including at least a compressor and a blower disposed in a vehicle body, the blower connected to a supply of air, comprising:
   a controller operable to control the operation of said compressor and said blower;
   an air duct disposed in the vehicle body and connected to an output of said blower;
   an evaporator disposed in said air duct and connected to a refrigerant inlet and a refrigerant outlet; and
   an ice formation indicator operable to provide at least a signal to said controller to allow the formation of a predetermined amount of ice to form on said evaporator during operation of said HVAC system.

2. The HVAC system according to claim 1 wherein said ice formation indicator is at least a pair of pressure gauges mounted on opposite surfaces of said evaporator.

3. The HVAC system according to claim 1 wherein said ice formation indicator is an emissivity measurement device mounted adjacent said evaporator.

4. The HVAC system according to claim 1 including a temperature measurement device disposed in said air duct and in communication with said controller.

5. The HVAC system according to claim 1 including a temperature measurement device disposed in a passenger compartment in said vehicle body and in communication with said controller.

6. The HVAC system according to claim 1 including a clutch operatively engaging said controller for selectively engaging said compressor.

7. The HVAC system according to claim 1 wherein said compressor is a variable capacity compressor.

8. The HVAC system according to claim 1 including means for preventing bacterial growth disposed in said air duct adjacent to said evaporator.

9. An HVAC system for a vehicle having a passenger compartment comprising:
   an air duct;
   a blower operatively engaging the air duct to selectively cause air flow through the air duct;
   a refrigerant circuit including a compressor, and an evaporator disposed in the air duct and exposed to the air flow in the air duct;
   an ice formation indicator operable to provide a signal indicative of a predetermined amount of ice formation on the evaporator and a remaining amount of the predetermined amount of ice formation on the evaporator; and
   a controller operable to receive the signal from the ice formation indicator and to control operation of the compressor and the blower based on the received signal.

10. The HVAC system of claim 9 wherein the controller is operable to cease the operation of the compressor when the ice formation indicator provides the signal indicative of the predetermined amount of ice formation on the evaporator and to begin operation of the compressor when the ice formation indicator provides the signal indicative of the remaining amount of the predetermined Ice formation being less than a second predetermined amount of ice formation on the evaporator.

11. The HVAC system of claim 10 wherein the controller is operable to begin operation of a vehicle engine when the operation of the compressor is begun.

12. The HVAC system of claim 9 wherein the ice formation indicator is a pair of pressure gauges mounted on opposed surfaces of the evaporator.

13. The HVAC system of claim 9 wherein the ice formation indicator is an emissivity measurement device mounted adjacent to the evaporator.

14. The HVAC system of claim 9 including a duct temperature sensor disposed in the air duct and a passenger compartment temperature sensor disposed in the passenger compartment, the duct temperature sensor and the passenger compartment temperature sensor operatively engaging the controller to begin operation of the compressor when the passenger compartment temperature sensor indicates a passenger compartment temperature that is greater than a duct temperature indicated by the duct temperature sensor.

15. The HVAC system of claim 14 wherein the controller is operable to begin operation of a vehicle engine when the operation of the compressor is begun.

16. The HVAC system of claim 9 including an ultraviolet light located adjacent to the evaporator.

* * * * *